US012645303B2

(12) United States Patent
Chen et al.

(10) Patent No.: US 12,645,303 B2
(45) Date of Patent: Jun. 2, 2026

(54) HEAD MOUNTED DISPLAY AND TRACKING MODE SWITCHING METHOD

(71) Applicant: HTC Corporation, Taoyuan City (TW)

(72) Inventors: Ching-Chun Chen, Taoyuan City (TW); Chien-Min Wu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 19/055,478

(22) Filed: Feb. 17, 2025

(65) Prior Publication Data

US 2025/0306689 A1     Oct. 2, 2025

Related U.S. Application Data

(60) Provisional application No. 63/572,906, filed on Apr. 1, 2024.

(51) Int. Cl.
*G06F 3/01* (2006.01)
*G02B 27/01* (2006.01)

(52) U.S. Cl.
CPC ......... *G06F 3/017* (2013.01); *G02B 27/0172* (2013.01); *G06F 3/011* (2013.01); *G02B 2027/0138* (2013.01); *G02B 2027/014* (2013.01)

(58) Field of Classification Search
CPC ..... G06F 3/017; G06F 3/011; G02B 27/0172; G02B 2027/0138; G02B 2027/014
See application file for complete search history.

(56) References Cited

U.S. PATENT DOCUMENTS

| | | | | |
|---|---|---|---|---|
| 10,521,947 | B2 * | 12/2019 | Yokokawa | ............... G06T 13/40 |
| 10,671,842 | B2 * | 6/2020 | Chen | ...................... G06V 10/25 |
| 11,249,314 | B1 | 2/2022 | Lin et al. | |
| 2013/0117707 | A1 | 5/2013 | Wheeler et al. | |
| 2019/0018498 | A1 * | 1/2019 | West | ...................... G06F 3/012 |
| 2019/0102927 | A1 * | 4/2019 | Yokokawa | ............... G06F 3/017 |
| 2019/0236344 | A1 * | 8/2019 | Chen | ...................... G06F 18/214 |
| 2021/0109606 | A1 | 4/2021 | Erivantcev et al. | |
| 2022/0043264 | A1 * | 2/2022 | Lin | ........................ G06F 3/011 |
| 2022/0163800 | A1 * | 5/2022 | Yokokawa | ............ A63F 13/213 |

FOREIGN PATENT DOCUMENTS

| | | |
|---|---|---|
| CN | 111771180 A | 10/2020 |
| TW | 1796192 B | 3/2023 |

OTHER PUBLICATIONS

The EESR of the corresponding European application No. EP 25166926.3 issued on Apr. 29, 2025.
The Office Action of the corresponding European application No. EP 25166926.3 issued on May 9, 2025.
(Continued)

*Primary Examiner* — Grant Sitta
(74) *Attorney, Agent, or Firm* — CKC & Partners Co., LLC

(57) ABSTRACT

A head mounted display and a tracking mode switching method are provided. The head mounted display calculates a first motion information corresponding to a controller and a second motion information corresponding to a tracked hand based on the real-time images. The head mounted display determines to switch to a hand-held controller tracking pose mode or a hand tracking pose mode based on a motion relationship between the controller and the tracked hand.

20 Claims, 6 Drawing Sheets

(56)                  References Cited

OTHER PUBLICATIONS

Immersive Insiders, "Simultaneous Hand and Controller Tracking Setup", Feb. 25, 2024 (Feb. 25, 2024), XP093269991, Retrieved from the Internet: URL:https://www.youtube.com/watch?v=EFIEnfOG6FU.

Anonymous M E et al., "How Meta Quest 3 Controller Tracking Works—ZyberVR", Nov. 3, 2023 (Nov. 3, 2023), pp. 1-13, XP093270002, Retrieved from the Internet: URL:https://zybervr.com/en-eu/blogs/news/how-meta-quest-3-controller-tracking-works?srsltid=AfmBOor4AzwX6nRv4wiYU91vjqJCV2oUgv00YCcFoxMiAEepJfD1R-71.

Anonymous, "Meta Quest v62 SDK NOW Supports Simultaneous Hand+Controller Tracking And More", Feb. 17, 2024 (Feb. 17, 2024), pp. 1-9, XP093270232, Retrieved from the Internet: URL:https://xrdailynews.com/meta-quest-v62-supports-multimodal-hand-controller/.

The office action of the corresponding Taiwanese application No. TW114112273 issued on Feb. 11, 2026.

* cited by examiner

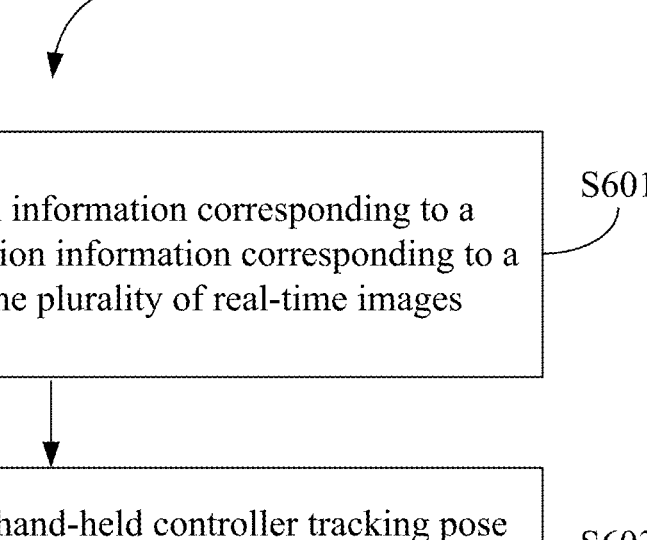

600

| calculating a first motion information corresponding to a controller and a second motion information corresponding to a tracked hand based on the plurality of real-time images | S601 |

| determining to switch to a hand-held controller tracking pose mode or a hand tracking pose mode based on a motion relationship between the controller and the tracked hand, wherein the motion relationship is generated based on the first motion information and the second motion information | S603 |

FIG. 6

HEAD MOUNTED DISPLAY AND TRACKING MODE SWITCHING METHOD

RELATED APPLICATIONS

This application claims the priority benefit of U.S. Provisional Application Ser. No. 63/572,906, filed Apr. 1, 2024, which is herein incorporated by reference.

BACKGROUND

Field of Invention

The present invention relates to a head mounted display and a tracking mode switching method. More particularly, the present invention relates to a head mounted display and tracking mode switching method that can actively switch tracking pose modes.

Description of Related Art

In recent years, various technologies related to virtual reality have developed rapidly, and various related technologies and applications have been proposed one after another.

In some application environments, users can perform interactive operations with a head mounted display by using their hands or by holding a controller. In this case, the head mounted display needs to determine the tracking mode that needs to be executed currently.

In the prior art, a head mounted display determines whether to enable the controller tracking mode by determining whether the controller is in a static state (for example, turned off or completely still on the table). When the controller is determined to be in the static state, the head-mounted display will enable hand tracking mode. In addition, when the controller is determined to be not in the static state, the head-mounted display may turn off the hand tracking mode and enable the controller tracking mode.

However, in some application environments, the controller may be attached to the user and move together with the user. In such a case, since the controller is not in the static state, the existing technology may not be able to correctly switch the tracking mode. In addition, if the hand tracking mode and the controller tracking mode are turned on at the same time, when the user is holding the controller, the controller may block part of the hand image, which may cause inaccurate hand tracking pose data, thereby reducing the user's service experience.

Accordingly, there is an urgent need for a technology that can actively switch tracking posture modes.

SUMMARY

An objective of the present disclosure is to provide a head mounted display. The head mounted display comprises an image capturing device and a processor. The processor is electrically connected to the image capturing device. The processor calculates a first motion information corresponding to a controller and a second motion information corresponding to a tracked hand based on the plurality of real-time images. The processor determines to switch to a hand-held controller tracking pose mode or a hand tracking pose mode based on a motion relationship between the controller and the tracked hand, and the motion relationship is generated based on the first motion information and the second motion information.

Another objective of the present disclosure is to provide a tracking mode switching method, which is adapted for use in an electronic apparatus. The electronic apparatus comprises an image capturing device and a processor. The image capturing device is configured to generate a plurality of real-time images. The tracking mode switching method comprises the following steps: calculating a first motion information corresponding to a controller and a second motion information corresponding to a tracked hand based on the plurality of real-time images; and determining to switch to a hand-held controller tracking pose mode or a hand tracking pose mode based on a motion relationship between the controller and the tracked hand, wherein the motion relationship is generated based on the first motion information and the second motion information.

According to the above descriptions, the tracking mode switching technology (at least including the head mounted display and the method) provided by the present disclosure dynamically determines whether to switch to the hand-held controller tracking pose mode or the hand tracking pose mode by actively determining the motion relationship between the controller and the tracked hand. The tracking mode switching technology provided by the present disclosure can adjust the display content presented on the display device based on the currently switched tracking pose mode. In addition, since the tracking mode switching technology provided by the present disclosure can perform appropriate tracking pose mode switching and display screen adjustment when the controller is not in the static state, it solves the problems of the prior art and improves the user's service experience.

The detailed technology and preferred embodiments implemented for the subject disclosure are described in the following paragraphs accompanying the appended drawings for people skilled in this field to well appreciate the features of the claimed invention.

BRIEF DESCRIPTION OF THE DRAWINGS

FIG. 6 is a partial flowchart depicting the tracking mode switching method of the second embodiment.

DETAILED DESCRIPTION

In the following description, a head mounted display and a tracking mode switching method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
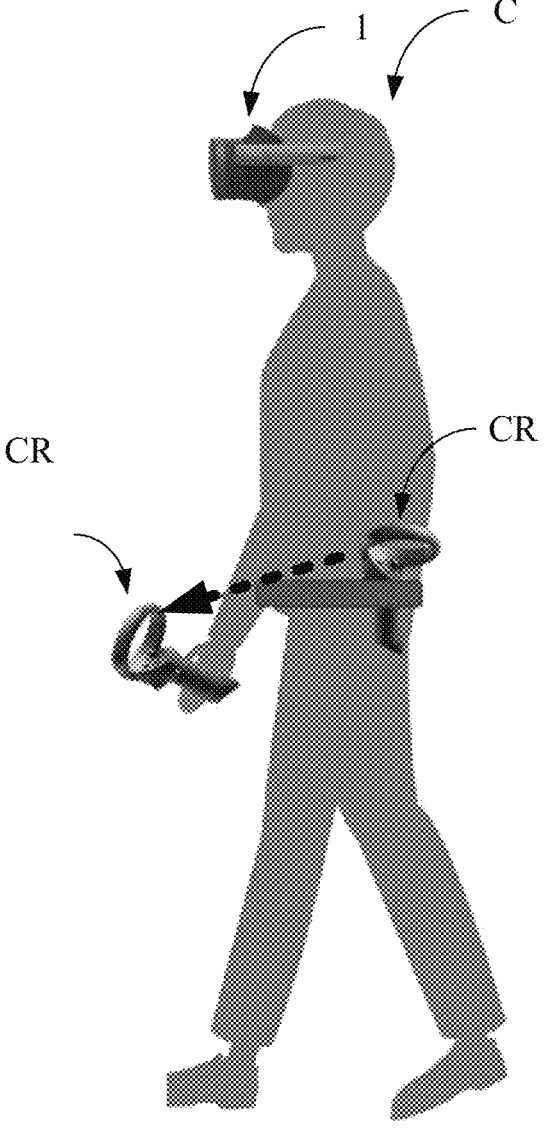
FIG. 1 is a schematic diagram depicting the environment of the first embodiment.

The applicable scenario of the present embodiment is first described, and its schematic diagram is depicted in FIG. 1. As shown in FIG. 1, in the application environment of the present disclosure, a user C may wear a head mounted display 1 and place a controller CR on the body (e.g., hanging it on a belt around the waist of the user C) to perform interactive operations corresponding to the display screen of the head mounted display 1. In the present example, the user C can directly perform interactive operations through hand tracking (e.g., gestures). In addition, the user C can take out the controller CR placed on the body and operate the controller CR to perform interactive operations of the handheld controller.

It shall be appreciated that the present disclosure does not limit the number of controllers used by the user C, and each controller CR can be paired with a part of the body of the user C during initial setting.

For example, one of the controllers CR can be paired to the left hand of the user C, and the other controller CR can be paired to the right hand of the user C. In addition, since controllers for different operators generally have distinguishable appearances (e.g., mirrored button configurations), the head mounted display 1 can distinguish different controllers CR through the appearance of the controllers CR.

For ease of understanding, the present disclosure will be described using one hand controlling the controller CR (e.g., the tracked hand using the controller CR). It should be understood that the tracking mode switching mechanism disclosed herein can be used independently on different tracked hands at the same time.

Figure 2:
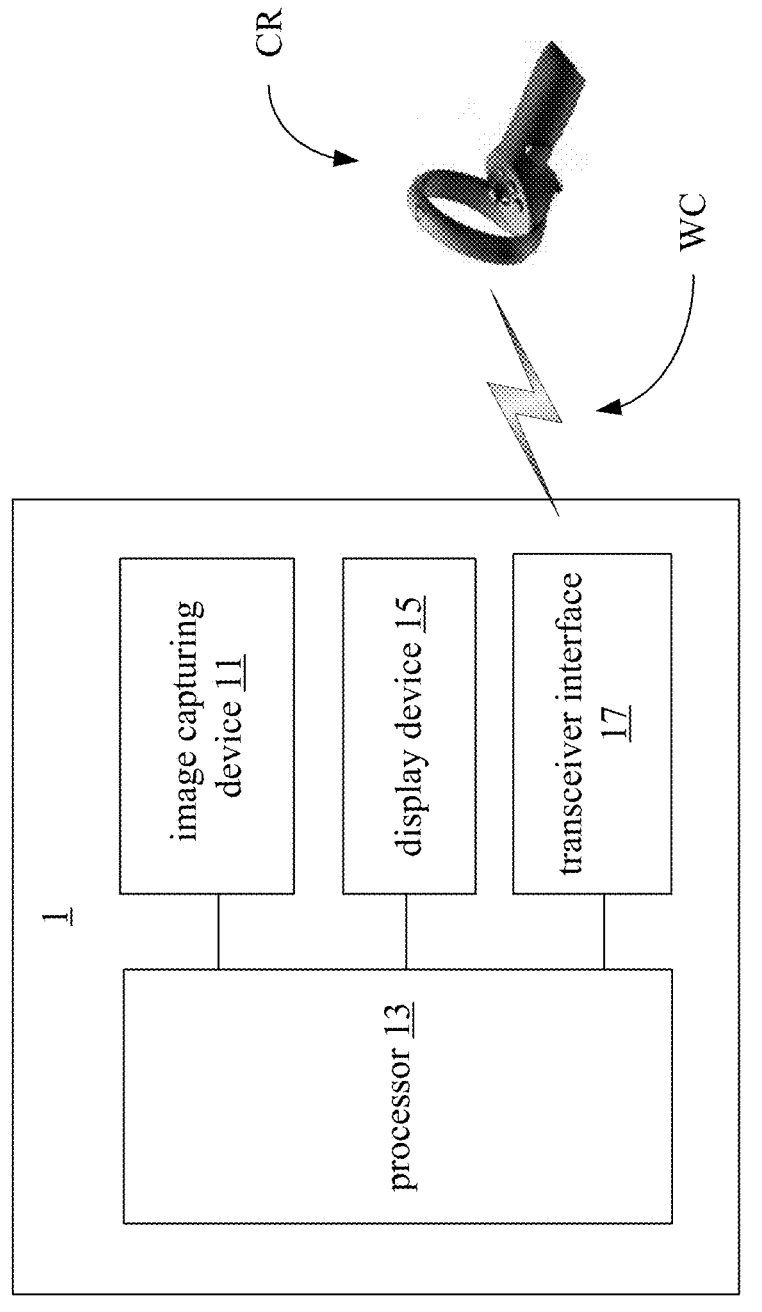
FIG. 2 is a schematic diagram depicting the structure of the head mounted display of some embodiments.

The first embodiment of the present disclosure is a head mounted display 1, a schematic structural diagram of which is depicted in FIG. 2. In the present embodiment, the head mounted display 1 comprises an image capturing device 11, a processor 13, a display device 15, and a transceiver interface 17. The processor 13 is electrically connected to the image capturing device 11, the display device 15, and the transceiver interface 17. The image capturing device 11 may comprise a plurality of image capturing units (e.g., a plurality of depth camera lenses) for capturing a plurality of real-time images including the hands of the user C or the hand-held controller CR.

In the present embodiment, the user C can use the controller CR to perform input operations such as moving, controlling, pressing, dragging, etc. The controller CR can perform corresponding operations of the sensing/tracking action. For example, the user C may use the head mounted display 1 and the controller CR to play a police role-playing interactive game. The display device 15 in the head mounted display 1 displays the controller CR as a pistol image.

It shall be appreciated that the image capturing device 11 may be image capturing device with an image capturing function (e.g., a plurality of depth camera lenses) to generate a plurality of real-time images corresponding to a field of view (FOV) to perform a tracking operation. The processor 13 may be any of various processors, Central Processing Units (CPUs), microprocessors, digital signal processors or other computing apparatuses known to those of ordinary skill in the art. The display device 15 can be any display screen with display function. The transceiver interface 17 is an interface capable of receiving and transmitting data or other interfaces capable of receiving and transmitting data and known to those of ordinary skill in the art. The transceiver interface can receive data from sources such as external apparatuses, external web pages, external applications, and so on.

First, in the present embodiment, the head mounted display 1 can continuously track the motion information of the controller and the tracked hand through the real-time images captured by the image capturing device 11, and determine the switching tracking mode based on the motion relationship between the controller and the tracked hand.

Specifically, the processor 13 calculates a first motion information corresponding to a controller and a second motion information corresponding to a tracked hand based on the real-time images. Next, the processor 13 determines to switch to a hand-held controller tracking pose mode or a hand tracking pose mode based on a motion relationship between the controller CR and the tracked hand, wherein the motion relationship is generated based on the first motion information and the second motion information.

In some embodiments, the head mounted display 1 can analyze the position and time series relationship of the controller CR and the tracked hand based on a frequency of 30-60 times per second to generate motion information.

For example, the motion information may include at least one of a position, a velocity, and a direction in a three-dimensional space, or a combination thereof. In addition, the motion relationship may include at least one of a distance relationship, a velocity relationship, and a direction relationship, or a combination thereof.

It shall be appreciated that the present disclosure determines whether the tracking controller CR is being operated by the tracking hand based on the motion trajectory and motion relationship between the controller CR and the tracked hand. For example, when the controller CR and the tracked hand are at a close distance and have a similar movement direction, the processor 13 can infer that the user C should currently hold the controller CR to perform interactive operations. On the contrary, if the distance between the controller CR and the tracked hand is far or the movement directions are obviously different, the processor 13 can infer that the controller CR is not currently operated by the tracked hand of the user C. For ease of understanding, the following will specifically describe the implementation of the present disclosure in different motion relationships.

In some embodiments, when the processor 13 determines that the spatial distance between the two targets is far, the processor 13 can actively switch to the hand tracking pose mode. Specifically, the processor 13 determines whether a spatial distance between the controller CR and the tracked hand is greater than or equal to a distance threshold (e.g., 10 cm). Next, in response to the spatial distance being greater than or equal to the distance threshold, the processor 13 determines to switch to the hand tracking pose mode.

In some embodiments, the processor 13 can calculate the spatial position and spatial distance between two targets through real-time image analysis. Specifically, the processor 13 calculates a first spatial position of the controller CR and a second spatial position corresponding to the tracked hand based on the real-time images. Next, the processor 13 calculates the spatial distance between the controller CR and the tracked hand based on the first spatial position and the second spatial position.

It shall be appreciated that the processor 13 may use the base of the palm (e.g., the wrist) as a reference point for determining the position of the tracked hand. In addition, the processor 13 may use the center of the controller CR as a reference point for determining the position of the controller CR.

In some embodiments, when the processor 13 determines that the movement directions of the controller CR and the tracked hand are similar, the processor 13 can actively switch to the hand-held controller tracking pose mode. Specifically, the processor 13 determines whether a spatial distance between the controller CR and the tracked hand is lower than a distance threshold. Next, in response to the spatial distance being lower than the distance threshold, the processor 13 determines whether an angle difference between a first motion vector corresponding to the controller CR and a second motion vector corresponding to the tracked hand is lower than an angle threshold (e.g., 5 degrees). Next, in response to the angle difference being lower than the angle threshold, the processor 13 determines to switch to the hand-held controller tracking pose mode.

In some embodiments, the processor 13 can further set a velocity threshold (e.g., 1 m/s) to avoid misjudgment caused by slight movements of the user C. Specifically, before determining whether the angle difference is lower than the angle threshold, the processor 13 determines whether a first movement velocity of the controller CR and a second movement velocity of the tracked hand are both greater than a velocity threshold. Next, in response to the first movement velocity and the second movement velocity being both greater than the velocity threshold, the processor 13 determines whether the angle difference is lower than the angle threshold. Then, in response to the first movement velocity and the second movement velocity not being both greater than the velocity threshold, the processor 13 suspends to execute the operation of determining the angle difference.

Figure 3:
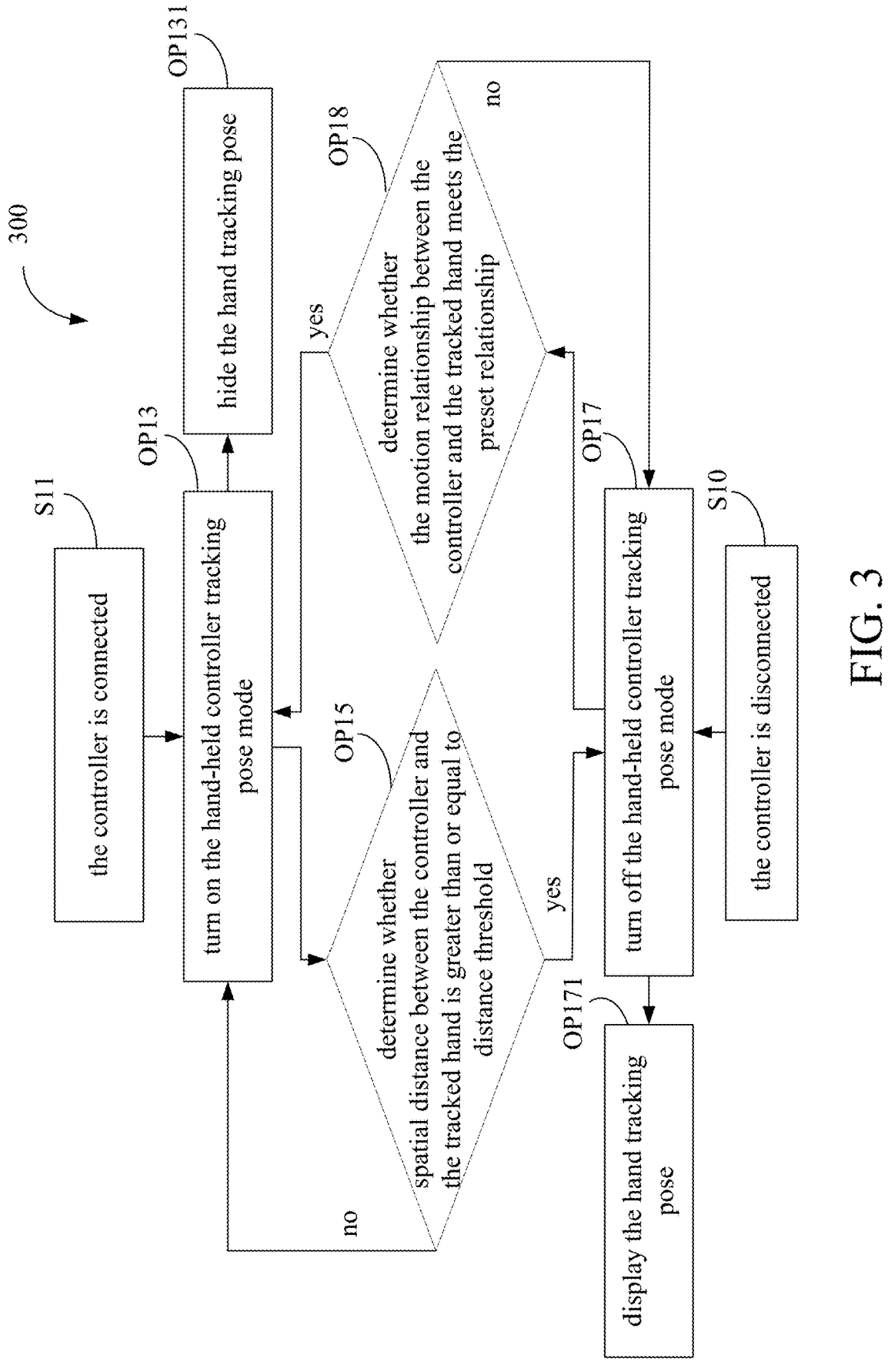
FIG. 3 is a schematic diagram depicting the operations of some embodiments.

For easier understanding, please refer to the operation diagram 300 in FIG. 3. In the present example, in the initial execution operation, when the controller CR is disconnected from the head mounted display 1, the operation may be started from the state S10. When the controller CR is connected to the head mounted display 1, the operation can be started from state S11.

First, when the processor 13 determines that the current state is S10, the processor 13 executes the operation OP17 to turn off the hand-held controller tracking pose mode (i.e., turn on the hand tracking pose mode), and executes the operation OP171 to display the hand tracking pose.

Next, the processor 13 executes the operation OP18 to determine whether the motion relationship between the controller CR and the tracked hand meets the preset relationship.

In the present example, in response to the motion relationship meeting the preset relationship, the processor 13 executes the operation OP13 to turn on the hand-held controller tracking pose mode, and executes the operation OP131 to hide the hand tracking pose (i.e., turn off the hand tracking pose mode).

In some embodiments, if the motion relationship between the controller CR and the tracked hand continues to conform to the preset relationship, the processor 13 may continue to maintain the state of enabling the hand-held controller tracking pose mode. If the motion relationship between the controller CR and the tracked hand does not meet the preset relationship, the processor 13 may execute the determination operation OP15.

In another example, when the current state is S11, the processor 13 executes the operation OP13 to turn on the hand-held controller tracking pose mode (i.e., turn off the hand tracking pose mode), and executes the operation OP131 to hide the hand tracking pose mode.

Next, the processor 13 executes the operation OP15 to determine whether the spatial distance between the controller CR and the tracked hand is greater than or equal to a distance threshold. Next, in response to the spatial distance being greater than or equal to the distance threshold, the processor 13 executes the operation OP17 to turn off the hand-held controller tracking pose mode (i.e., turn on the hand tracking pose mode), and executes the operation OP171 to display the hand tracking pose.

It shall be appreciated that the processor 13 can determine whether to switch to the hand-held controller tracking pose mode or the hand tracking pose mode by continuously executing the above-mentioned determination operation.

Figure 4:
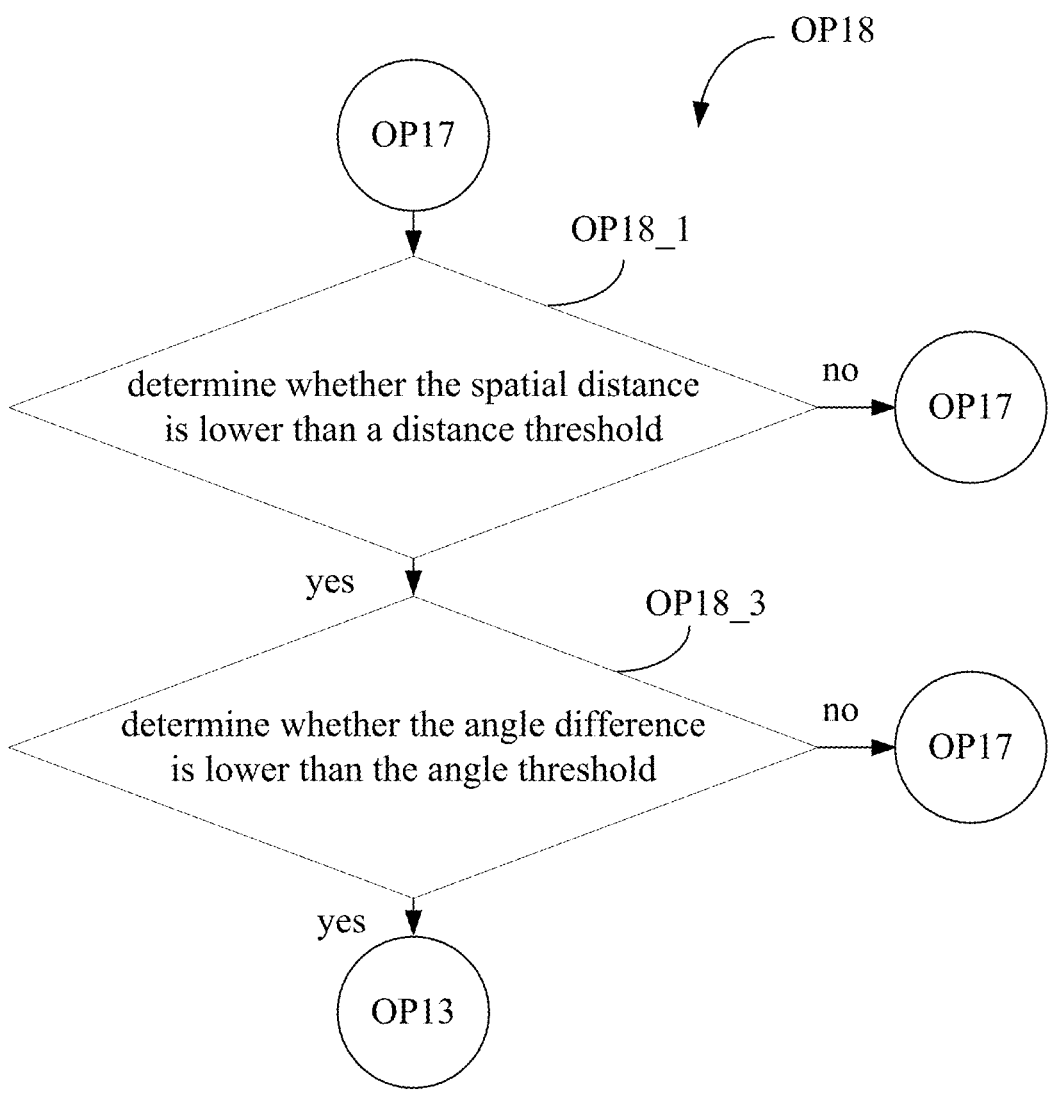
FIG. 4 is a schematic diagram depicting the operations of some embodiments.

In some embodiments, the operation OP18 may include determination operations as shown in FIG. 4. In the present example, the processor 13 executes the operation OP18_1 to determine whether the spatial distance between the controller CR and the tracked hand is lower than a distance threshold. In response to the spatial distance between the controller CR and the tracked hand being lower than the distance threshold, the processor 13 executes the operation OP18_3 to determine whether the angle difference between the first motion vector corresponding to the controller CR and the second motion vector corresponding to the tracked hand is lower than the angle threshold. In response to the angle difference being lower than the angle threshold, the processor 13 executes the operation OP13 to enable the hand-held controller tracking pose mode.

Figure 5:
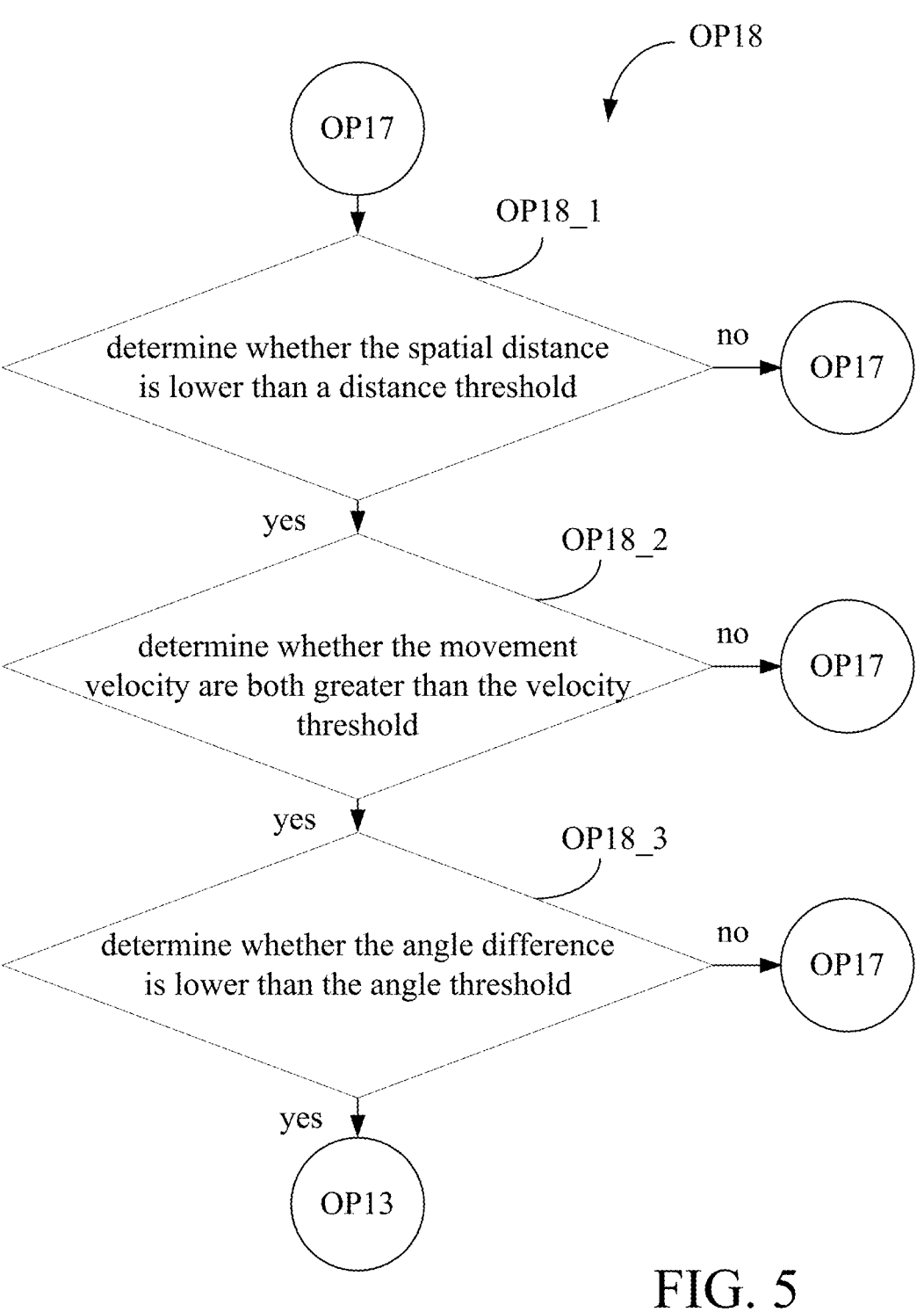
FIG. 5 is a schematic diagram depicting the operations of some embodiments.

In some embodiments, the operation OP18 may include determination operations as shown in FIG. 5. In the present example, the processor 13 executes the operation OP18_1 to determine whether the spatial distance between the controller CR and the tracked hand is lower than a distance threshold. In response to the spatial distance between the controller CR and the tracked hand being lower than the distance threshold, the processor 13 executes the operation OP18_2 to determine whether the first movement velocity of the controller CR and the second movement velocity of the tracked hand are both greater than the velocity threshold. In response to the movement velocity being greater than the velocity threshold, the processor 13 executes the operation OP18_3 to determine whether the angle difference between the first movement vector corresponding to the controller CR and the second movement vector corresponding to the tracked hand is lower than the angle threshold. In response to the angle difference being lower than the angle threshold, the processor 13 executes the operation OP13 to enable the hand-held controller tracking pose mode.

In some embodiments, in order to improve the accuracy of the motion information of the controller CR. In some embodiments, the controller CR may include an inertial measurement unit (IMU), which may continuously generate a sequence of a plurality of inertial measurement parameters (e.g., a stream of inertial measurement parameters generated at a frequency of 10 times per second). For example, each of the inertial measurement parameters may include, for example, an acceleration, a rotation amount, and an angular acceleration.

Specifically, the processor 13 receives a sequence of a plurality of inertial measurement parameters from the controller CR (e.g., via the wireless communication link WC in FIG. 2). Next, the processor 13 calculates the first motion information corresponding to the controller CR based on the real-time images and the inertial measurement parameters. In some embodiments, the wireless communication connection WC may be a Bluetooth Low Energy (BLE) communication connection or a Wi-Fi wireless network connection.

In some embodiments, the processor 13 may also dynamically adjust the frequency of determining the switching operation based on the frequency of changes in the motion information. For example, when the processor 13 determines that the user C is in a relatively intense exercise state, the frequency of determining the switching operation is increased. When the processor 13 determines that the user C is in a relatively calm exercise state, the frequency of determining the switching operation is reduced.

In some embodiments, the processor 13 and the display device 15 of the head mounted display 1 can dynamically adjust the displayed content in response to different tracking modes. Specifically, in response to switching to the hand tracking pose mode, the processor 13 generates a hand tracking pose corresponding to the tracked hand based on the hand tracking pose mode. Next, the processor 13 transmits the hand tracking pose to the display device 15 to make the display device 15 display the hand tracking pose corresponding to the tracked hand.

In some embodiments, in response to switching to the hand-held controller tracking pose mode, the processor 13 generates a controller tracking pose corresponding to the controller CR based on the hand-held controller tracking pose mode and hides the hand tracking pose corresponding to the tracked hand. Next, the processor 13 transmits the controller tracking pose to the display device 15 to make the display device 15 display the controller tracking pose corresponding to the controller CR.

In some embodiments, since the user's hand is holding the controller CR, the processor 13 can generate a corresponding hand tracking pose through the tracking information of the controller CR. Specifically, the processor 13 generates a new hand tracking pose corresponding to the tracked hand based on the controller tracking pose. Next, the processor 13 transmits the new hand tracking pose to the display device 15 to make the display device 15 display the new hand tracking pose corresponding to the tracked hand.

In some embodiments, the processor 13 synthesizes a virtual hand image to the controller tracking pose to generate the new hand tracking pose. For example, the processor 13 may analyze the touched button (e.g., capacitive sensing device) on the controller CR to present a screen corresponding to the finger touch.

According to the above descriptions, the head mounted display 1 provided by the present disclosure dynamically determines whether to switch to the hand-held controller tracking pose mode or the hand tracking pose mode by actively determining the motion relationship between the controller and the tracked hand. The head mounted display 1 provided by the present disclosure can adjust the display content presented on the display device based on the currently switched tracking pose mode. In addition, since the head mounted display 1 provided by the present disclosure can perform appropriate tracking pose mode switching and display screen adjustment when the controller is not in the static state, it solves the problems of the prior art and improves the user's service experience.

A second embodiment of the present disclosure is a tracking mode switching method and a flowchart thereof is depicted in FIG. 6. The tracking mode switching method 600 is adapted for an electronic apparatus (e.g., the head mounted display 1 described in the first embodiment). The electronic apparatus comprises an image capturing device and a processor (e.g., the image capturing device 11 and the processor 13 described in the first embodiment). The image capturing device is configured to generate a plurality of real-time images. The tracking mode switching method 600 determines whether to switch to a hand-held controller tracking pose mode or a hand tracking pose mode through the steps S601 to S603.

In the step S601, the electronic apparatus calculates a first motion information corresponding to a controller and a second motion information corresponding to a tracked hand based on the plurality of real-time images.

In the step S603, the electronic apparatus determines to switch to a hand-held controller tracking pose mode or a hand tracking pose mode based on a motion relationship between the controller and the tracked hand, wherein the motion relationship is generated based on the first motion information and the second motion information.

In some embodiments, wherein the electronic apparatus further comprises a display device, and the tracking mode switching method 600 further comprises the following steps: in response to switching to the hand tracking pose mode, generating a hand tracking pose corresponding to the tracked hand based on the hand tracking pose mode; and transmitting the hand tracking pose to the display device to make the display device display the hand tracking pose corresponding to the tracked hand.

In some embodiments, wherein the electronic apparatus further comprises a display device, and the tracking mode switching method 600 further comprises the following steps: in response to switching to the hand-held controller tracking pose mode, generating a controller tracking pose corresponding to the controller based on the hand-held controller tracking pose mode, and hiding a hand tracking pose corresponding to the tracked hand; and transmitting the controller tracking pose to the display device to make the display device display the controller tracking pose corresponding to the controller.

In some embodiments, wherein the tracking mode switching method 600 further comprises the following steps: generating a new hand tracking pose corresponding to the tracked hand based on the controller tracking pose; and transmitting the new hand tracking pose to the display device to make the display device display the new hand tracking pose corresponding to the tracked hand.

In some embodiments, wherein the step of generating the new hand tracking pose corresponding to the tracked hand comprises the following steps: synthesizing a virtual hand image to the controller tracking pose to generate the new hand tracking pose.

In some embodiments, wherein the step of determining to switch to the hand-held controller tracking pose mode or the hand tracking pose mode further comprises the following steps: determining whether a spatial distance between the controller and the tracked hand is greater than or equal to a distance threshold; and in response to the spatial distance being greater than or equal to the distance threshold, determining to switch to the hand tracking pose mode.

In some embodiments, wherein the step of calculating the spatial distance between the controller and the tracked hand comprises the following steps: calculating a first spatial position of the controller and a second spatial position corresponding to the tracked hand based on the plurality of real-time images; and calculating the spatial distance between the controller and the tracked hand based on the first spatial position and the second spatial position.

In some embodiments, wherein the step of determining to switch to the hand-held controller tracking pose mode or the hand tracking pose mode further comprises the following steps: determining whether a spatial distance between the controller and the tracked hand is lower than a distance threshold; in response to the spatial distance being lower than the distance threshold, determining whether an angle difference between a first motion vector corresponding to the controller and a second motion vector corresponding to the tracked hand is lower than an angle threshold; and in response to the angle difference being lower than the angle threshold, determining to switch to the hand-held controller tracking pose mode.

In some embodiments, wherein before performing the step of determining whether the angle difference is lower than the angle threshold, the tracking mode switching method 600 further comprises the following steps: determining whether a first movement velocity of the controller and a second movement velocity of the tracked hand are both greater than a velocity threshold; in response to the first movement velocity and the second movement velocity being both greater than the velocity threshold, determining whether the angle difference is lower than the angle threshold; and in response to the first movement velocity and the second movement velocity not both being greater than the velocity threshold, suspending to execute the operation of determining the angle difference.

In some embodiments, wherein the tracking mode switching method 600 further comprises the following steps: receiving, by the electronic apparatus, a sequence of a plurality of inertial measurement parameters from the controller; and calculating, by the electronic apparatus, the first motion information corresponding to the controller based on the plurality of real-time images and the plurality of inertial measurement parameters.

In addition to the aforesaid steps, the second embodiment can also execute all the operations and steps of the head mounted display 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tracking mode switching method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head mounted display 1), the computer program executes the tracking mode switching method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the motion information, the spatial position, the motion vector, and the movement velocity) are preceded by terms such as "first" or "second", and these terms of "first" or "second" are only used to distinguish these different words. For example, the "first" and "second" motion information are only used to indicate the motion information used in different operations.

According to the above descriptions, the tracking mode switching technology (at least including the head mounted display and the method) provided by the present disclosure dynamically determines whether to switch to the hand-held controller tracking pose mode or the hand tracking pose mode by actively determining the motion relationship between the controller and the tracked hand. The tracking mode switching technology provided by the present disclosure can adjust the display content presented on the display device based on the currently switched tracking pose mode. In addition, since the tracking mode switching technology provided by the present disclosure can perform appropriate tracking pose mode switching and display screen adjustment when the controller is not in the static state, it solves the problems of the prior art and improves the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head mounted display, comprising:
a plurality of depth camera lenses, being configured to generate a plurality of real-time images; and
a processor, being electrically connected to the plurality of depth camera lenses, and being configured to perform the following operations:
  calculating a first motion information corresponding to a controller and a second motion information corresponding to a tracked hand based on the plurality of real-time images; and
  determining to switch to a hand-held controller tracking pose mode or a hand tracking pose mode based on a motion relationship between the controller and the tracked hand, wherein the motion relationship is generated based on the first motion information and the second motion information, wherein the operation of determining to switch to the hand-held controller tracking pose mode or the hand tracking pose mode further comprises the following operations:
  determining whether a first movement velocity of the controller and a second movement velocity of the tracked hand are both greater than a velocity threshold; and
  in response to the first movement velocity and the second movement velocity being both greater than the velocity threshold, determining to switch to the hand-held controller tracking pose mode or the hand tracking pose mode.

2. The head mounted display of claim 1, wherein the head mounted display further comprises:
a display device, being electrically connected to the processor;
wherein the processor further performs the following operations:

in response to switching to the hand tracking pose mode, generating a hand tracking pose corresponding to the tracked hand based on the hand tracking pose mode; and transmitting the hand tracking pose to the display device to make the display device display the hand tracking pose corresponding to the tracked hand.

3. The head mounted display of claim 1, wherein the head mounted display further comprises:

a display device, being electrically connected to the processor;

wherein the processor further performs the following operations:

in response to switching to the hand-held controller tracking pose mode, generating a controller tracking pose corresponding to the controller based on the hand-held controller tracking pose mode, and hiding a hand tracking pose corresponding to the tracked hand; and transmitting the controller tracking pose to the display device to make the display device display the controller tracking pose corresponding to the controller.

4. The head mounted display of claim 3, wherein the processor is further configured to perform the following operations:

generating a new hand tracking pose corresponding to the tracked hand based on the controller tracking pose; and transmitting the new hand tracking pose to the display device to make the display device display the new hand tracking pose corresponding to the tracked hand.

5. The head mounted display of claim 4, wherein the operation of generating the new hand tracking pose corresponding to the tracked hand comprises the following operations:

synthesizing a virtual hand image to the controller tracking pose to generate the new hand tracking pose.

6. The head mounted display of claim 1, wherein the operation of determining to switch to the hand-held controller tracking pose mode or the hand tracking pose mode further comprises the following operations:

determining whether a spatial distance between the controller and the tracked hand is greater than or equal to a distance threshold; and in response to the spatial distance being greater than or equal to the distance threshold, determining to switch to the hand tracking pose mode.

7. The head mounted display of claim 6, wherein the operation of calculating the spatial distance between the controller and the tracked hand comprises the following operations:

calculating a first spatial position of the controller and a second spatial position corresponding to the tracked hand based on the plurality of real-time images; and calculating the spatial distance between the controller and the tracked hand based on the first spatial position and the second spatial position.

8. The head mounted display of claim 1, wherein the operation of determining to switch to the hand-held controller tracking pose mode or the hand tracking pose mode further comprises the following operations:

determining whether a spatial distance between the controller and the tracked hand is lower than a distance threshold;

in response to the spatial distance being lower than the distance threshold, determining whether an angle difference between a first motion vector corresponding to the controller and a second motion vector corresponding to the tracked hand is lower than an angle threshold; and in response to the angle difference being lower than the angle threshold, determining to switch to the hand-held controller tracking pose mode.

9. The head mounted display of claim 8, wherein before performing the operation of determining whether the angle difference is lower than the angle threshold, the processor further performs the following operations:

determining whether the first movement velocity of the controller and the second movement velocity of the tracked hand are both greater than the velocity threshold;

in response to the first movement velocity and the second movement velocity being both greater than the velocity threshold, determining whether the angle difference is lower than the angle threshold; and in response to the first movement velocity and the second movement velocity not both being greater than the velocity threshold, suspending to execute the operation of determining the angle difference.

10. The head mounted display of claim 1, wherein the processor further performs the following operations:

receiving a sequence of a plurality of inertial measurement parameters from the controller; and calculating the first motion information corresponding to the controller based on the plurality of real-time images and the plurality of inertial measurement parameters.

11. A tracking mode switching method, being adapted for use in an electronic apparatus, wherein the electronic apparatus comprises a plurality of depth camera lenses and a processor, the plurality of depth camera lenses is configured to generate a plurality of real-time images, and the tracking mode switching method comprises the following step:

calculating a first motion information corresponding to a controller and a second motion information corresponding to a tracked hand based on the plurality of real-time images; and determining to switch to a hand-held controller tracking pose mode or a hand tracking pose mode based on a motion relationship between the controller and the tracked hand, wherein the motion relationship is generated based on the first motion information and the second motion information, wherein the step of determining to switch to the hand-held controller tracking pose mode or the hand tracking pose mode further comprises the following steps:

determining whether a first movement velocity of the controller and a second movement velocity of the tracked hand are both greater than a velocity threshold; and in response to the first movement velocity and the second movement velocity being both greater than the velocity threshold, determining to switch to the hand-held controller tracking pose mode or the hand tracking pose mode.

12. The tracking mode switching method of claim 11, wherein the electronic apparatus further comprises a display device, and the tracking mode switching method further comprises the following steps:

in response to switching to the hand tracking pose mode, generating a hand tracking pose corresponding to the tracked hand based on the hand tracking pose mode; and transmitting the hand tracking pose to the display device to make the display device display the hand tracking pose corresponding to the tracked hand.

13. The tracking mode switching method of claim 11, wherein the electronic apparatus further comprises a display device, and the tracking mode switching method further comprises the following steps:

in response to switching to the hand-held controller tracking pose mode, generating a controller tracking pose corresponding to the controller based on the hand-held controller tracking pose mode, and hiding a hand tracking pose corresponding to the tracked hand; and transmitting the controller tracking pose to the display device to make the display device display the controller tracking pose corresponding to the controller.

14. The tracking mode switching method of claim 13, wherein the tracking mode switching method further comprises the following steps:

generating a new hand tracking pose corresponding to the tracked hand based on the controller tracking pose; and transmitting the new hand tracking pose to the display device to make the display device display the new hand tracking pose corresponding to the tracked hand.

15. The tracking mode switching method of claim 14, wherein the step of generating the new hand tracking pose corresponding to the tracked hand comprises the following steps:

synthesizing a virtual hand image to the controller tracking pose to generate the new hand tracking pose.

16. The tracking mode switching method of claim 11, wherein the step of determining to switch to the hand-held controller tracking pose mode or the hand tracking pose mode further comprises the following steps:

determining whether a spatial distance between the controller and the tracked hand is greater than or equal to a distance threshold; and in response to the spatial distance being greater than or equal to the distance threshold, determining to switch to the hand tracking pose mode.

17. The tracking mode switching method of claim 16, wherein the step of calculating the spatial distance between the controller and the tracked hand comprises the following steps:

calculating a first spatial position of the controller and a second spatial position corresponding to the tracked hand based on the plurality of real-time images; and calculating the spatial distance between the controller and the tracked hand based on the first spatial position and the second spatial position.

18. The tracking mode switching method of claim 11, wherein the step of determining to switch to the hand-held controller tracking pose mode or the hand tracking pose mode further comprises the following steps:

determining whether a spatial distance between the controller and the tracked hand is lower than a distance threshold;

in response to the spatial distance being lower than the distance threshold, determining whether an angle difference between a first motion vector corresponding to the controller and a second motion vector corresponding to the tracked hand is lower than an angle threshold; and in response to the angle difference being lower than the angle threshold, determining to switch to the hand-held controller tracking pose mode.

19. The tracking mode switching method of claim 18, wherein before performing the step of determining whether the angle difference is lower than the angle threshold, the tracking mode switching method further comprises the following steps:

determining whether the first movement velocity of the controller and the second movement velocity of the tracked hand are both greater than the velocity threshold;

in response to the first movement velocity and the second movement velocity being both greater than the velocity threshold, determining whether the angle difference is lower than the angle threshold; and in response to the first movement velocity and the second movement velocity not both being greater than the velocity threshold, suspending to execute the operation of determining the angle difference.

20. The tracking mode switching method of claim 11, wherein the tracking mode switching method further comprises the following steps:

receiving, by the electronic apparatus, a sequence of a plurality of inertial measurement parameters from the controller; and calculating, by the electronic apparatus, the first motion information corresponding to the controller based on the plurality of real-time images and the plurality of inertial measurement parameters.

* * * * *